United States Patent
McCanne et al.

(10) Patent No.: US 6,415,323 B1
(45) Date of Patent: Jul. 2, 2002

(54) PROXIMITY-BASED REDIRECTION SYSTEM FOR ROBUST AND SCALABLE SERVICE-NODE LOCATION IN AN INTERNETWORK

(75) Inventors: Steven McCanne, Berkeley; William C. Destein, Pleasanton, both of CA (US)

(73) Assignee: FastForward Networks, Foster City, CA (US)

(*) Notice: Subject to any disclaimer, the term of this patent is extended or adjusted under 35 U.S.C. 154(b) by 0 days.

(21) Appl. No.: 09/458,216

(22) Filed: Dec. 9, 1999

Related U.S. Application Data

(60) Provisional application No. 60/152,257, filed on Sep. 3, 1999.

(51) Int. Cl.[7] .............................................. G06F 15/173
(52) U.S. Cl. ........................ 709/225; 709/224; 709/244
(58) Field of Search ................................ 709/105, 238, 709/239, 224, 225, 243, 244, 229; 370/396, 701, 400, 385, 475, 238

(56) References Cited

U.S. PATENT DOCUMENTS

| | | | | |
|---|---|---|---|---|
| 5,774,660 A | * | 6/1998 | Brendel et al. ............. 709/201 |
| 5,774,668 A | * | 6/1998 | Choquier et al. ........... 709/223 |
| 5,822,320 A | * | 10/1998 | Horikawa et al. .......... 370/396 |
| 5,956,716 A | | 9/1999 | Kenner et al. ................ 707/10 |
| 6,003,030 A | | 12/1999 | Kenner et al. ................ 707/10 |
| 6,014,698 A | * | 1/2000 | Griffiths ...................... 709/224 |
| 6,052,718 A | | 4/2000 | Gifford ........................ 709/219 |
| 6,092,178 A | * | 7/2000 | Jindal et al. ................... 712/27 |
| 6,098,106 A | * | 8/2000 | Philyaw et al. ............. 709/238 |
| 6,112,239 A | | 8/2000 | Kenner et al. ............... 709/224 |
| 6,115,752 A | * | 9/2000 | Chauhan ...................... 709/241 |
| 6,131,120 A | * | 10/2000 | Reid ............................ 709/225 |
| 6,195,751 B1 | * | 2/2001 | Caronni et al. ............. 713/163 |
| 6,236,652 B1 | * | 5/2001 | Preston et al. ............... 370/349 |
| 6,327,252 B1 | * | 12/2001 | Silton et al. ................. 370/256 |
| 6,331,983 B1 | * | 12/2001 | Haggerty et al. ........... 370/400 |
| 6,331,984 B1 | * | 12/2001 | Luciani ....................... 370/401 |
| 6,333,918 B1 | * | 12/2001 | Hummel ...................... 370/238 |

FOREIGN PATENT DOCUMENTS

WO    WO 98/57275    * 12/1998

OTHER PUBLICATIONS

Chiu, G.M. et al. "Resource allocation with load balancing consideration in distributed computing systems", IEEE INFOCOM '89, ISBN: 0-8186-1920-1, pp. 758-765, Apr. 1989.*

Partridge et al. "Host Anycasting Service", RFC 1546, pp. 1-8, Nov. 1993.*

(List continued on next page.)

Primary Examiner—Robert B. Harrell
Assistant Examiner—Jason D. Cardone
(74) Attorney, Agent, or Firm—Townsend and Townsend and Crew LLP

(57) ABSTRACT

A proximity-oriented redirection system for service-to-client attachment in a virtual overlay distribution network. The virtual overlay distribution network includes addressable routers for routing packet traffic, wherein a packet of data is routed from a source node to a destination node based on address fields of the packet. The invention includes a redirector coupled to at least one of the addressable routers and includes: logic for accepting a service request from a client; logic for determining a selected server for handling the service request, the selected server being one of a plurality of servers that can handle the service request; and logic for generating a redirection message directed to the client for redirecting the service request to the selected server.

22 Claims, 9 Drawing Sheets

OTHER PUBLICATIONS

Guyton et al. "Locating Nearby Copies of Replicated Internet Servers", SIGCOMM '95, ACM 0–89791–711–1, pp. 288–298, 1995.*

Hinden, Robert M., "IP Next Generation Overview", Communication of The ACM, pp. 61–71, Jun. 1996.*

Bhattacharjee et al. "Application–layer Anycasting", INFOCOM '97, pp. 1388–1396, Apr. 1997.*

Xuan et al. "Routing Algorithms for Anycast Messages", 1998 Interconference on Parallel Processing, pp. 1–9, Aug. 1998.*

Cholewka, Kathleen, "New Routing Technique Takes The Quicker Path", Inter@ctive Week, pp. 1–3, Nov. 1998.*

Johnson et al. "Reserved IPv6 Subnet Anycast Addresses", RFC 2526, pp. 1–7, Mar. 1999.*

Wu, Z.D. et al. "Optimal Video Distribution Using Anycasting Server", INET '99, pp. 1–10, Jun. 1999.*

Hinden, R. et al. "IP Version 6 Addressing Architecture", Internet–Draft, pp. 1–24, Oct. 2000.*

* cited by examiner

PROXIMITY-BASED REDIRECTION SYSTEM FOR ROBUST AND SCALABLE SERVICE-NODE LOCATION IN AN INTERNETWORK

CROSS-REFERENCES TO RELATED APPLICATIONS

This application claims priority from a co-pending U.S. Provisional Patent Application No. 60/152,257 filed Sep. 3, 1999. This application is related to U.S. patent application Ser. No. 09/323,869 entitled "PERFORMING MULTICAST COMMUNICATION IN COMPUTER NETWORKS BY USING OVERLAY ROUTING" filed on Jun. 1, 1999 and to U.S. Provisional Patent Application No. 60/115,454 entitled "SYSTEM FOR PROVIDING APPLICATION-LEVEL FEATURES TO MULTICAST ROUTING IN COMPUTER NETWORKS" filed on Jan. 11, 1999. The disclosures of each of the above identified applications are incorporated in their entirety herein by reference for all purposes.

FIELD OF THE INVENTION

This invention relates generally to the field of data networks, and more particularly, to the distribution of information on a data network.

BACKGROUND OF THE INVENTION

One of the pivotal challenges in scaling the Internet infrastructure for mass adoption is the problem of distributing arbitrary content from a sourcing site to many users in the Internet in an efficient, viable, and cost effective fashion. The dissemination of popular news articles, video broadcasts, stock quotes, new releases of popular software, and so forth all can result in the so-called flash effect, where large numbers of users spread across the network all try to retrieve the same content from the same server at roughly the same time. Not only does a traffic flash bring a server to its knees, but it also wastes network bandwidth because many redundant copies of the same content flow across the wide-area network. For example, a breaking news event on CNN's web site could cause millions of users to fetch the article's text off their server. Likewise, the premiere run of a high-visibility movie broadcast over the Internet could similarly encourage millions of users to attempt to access the media content server.

Two key mechanisms for the Web have been proposed to overcome the problems induced by the flash effect, namely, caching and server replication. In caching, a cache is situated at a strategic location within the network infrastructure to intercept content requests from the clients. When the cache receives a content request, it consults its store of content and if the requested data is present, the cache serves the request locally. Otherwise, the request is relayed to the origin server and the response is relayed back to the client. During this process the cache stores the response in its local store. Many strategies have been proposed for managing the local store, e.g., deciding when to discard an object from the cache, when to refresh an object that may be different from the server, and so forth. Caches may be non-transparent, in which the client is explicitly configured with the cache's network address, or transparent, in which the client is ignorant of the cache and the cache intercepts the content request transparently, e.g., using a layer-4 switch.

In server replication, servers are deployed across the wide area and clients are assigned to these distributed servers to balance the load and save network bandwidth. These replicated servers may have some or all of the content contained at the origin server and many variations exist for how a particular arrangement of servers are deployed, how content is distributed to them from the master server, and how clients are assigned to the appropriate server.

Much of the technology that has been developed to support these types of server replication and caching technologies is ad hoc and incongruent with the underlying Internet architecture. For example, common techniques for transparent caching break the semantics of TCP and are thus incompatible with certain modes of the underlying IP packet service like multipath routing. This leads to a number of difficult management problems and, in particular, does not provide a cohesive network architecture that can be managed in a sensible fashion from a network operations center.

A similar content distribution problem involves the delivery of live streaming media to many users across the Internet. Here, a server produces a live broadcast feed and clients connect to the server using streaming media transport protocols to receive the broadcast. However, as more and more clients tune in to the broadcast, the server and network becomes overwhelmed by the task of delivering a large number of packet streams to a large number of clients.

One solution to this live broadcast problem is to leverage the efficiency of network layer multicast, or IP Multicast as defined in the Internet architecture. In this approach, a server transmits a single stream of packets to a "multicast group" rather than sending a separate copy of the stream to each individual client. In turn, receivers interested in the stream in question "tune in" to the broadcast by subscribing to the multicast group (e.g., by signaling to the nearest router the subscription information using the Internet Group Management Protocol, IGMP). The network efficiently delivers the broadcast to each receiver by copying packets only at fan out points in the distribution path from the source to all receivers. Thus, only one copy of each packet appears on any physical link.

Unfortunately, a wide variety of deployment and scalability problems have confounded the acceptance and proliferation of IP Multicast in the global Internet. Many of these problems follow fundamentally from the fact that computing a multicast distribution tree requires that all routers in the network have a uniformly consistent view of what that tree looks like. In multicast, each router must have the correct local view of a single, globally consistent multicast routing tree. If routers have disparate views of a given multicast tree in different parts of the network, then routing loops and black holes are inevitable. A number of other problems—e.g., multicast address allocation, multicast congestion control, reliable delivery for multicast, etc.—have also plagued the deployment and acceptance of IP Multicast. Despite substantial strides in the last couple of years toward commercial deployment of multicast, the resulting infrastructure is still relatively fragile and its reach is extremely limited.

In addition to the substantial technical barriers to the deployment of a ubiquitous Internet multicast service, there are business and economic barriers as well. Internet service providers have not had much success at offering wide-area multicast services because managing, monitoring, and provisioning for multicast traffic is quite difficult. Moreover, it is difficult to control who in a multicast session can generate traffic and to what parts of the network that traffic is allowed to reach. Because of these barriers, a multicast service that reaches the better part of the Internet is unlikely to ever emerge. Even if it does emerge, the process will undoubtedly take many years to unfold.

To avoid the pitfalls of multicast, others have proposed that the streaming-media broadcasts be enabled by an application-level solution called a splitter network. In this approach, a set of servers distributed across the network are placed at strategic locations within the service providers' networks. These servers are provided with a "splitting" capability, which allows them to replicate a given stream to a number of downstream servers. With this capability, servers can be arranged into a tree-like hierarchy, where the root server sources a stream to a number of downstream servers, which in turn split the stream into a number of copies that are forwarded to yet another tier of downstream servers.

Unfortunately, a splitter network of servers is plagued with a number of problems. First, the tree of splitters is statically configured, which means that if a single splitter fails, the entire sub-tree below the point of failure loses service. Second, the splitter network must be oriented toward a single broadcast center, requiring separate splitter networks composed of distinct physical servers to be maintained for each broadcast network. Third, since the splitter abstraction is based on an extension of a media server, it is necessarily platform dependent, e.g., a RealNetworks-based splitter network cannot distribute Microsoft Netshow traffic. Fourth, splitter networks are highly bandwidth inefficient since they do not track receiver interest and prune traffic from sub-trees of the splitter network that have no downstream receivers. Finally, splitter networks provide weak policy controls—the aggregate bit rate consumed along a path between two splitter nodes cannot be controlled and allocated to different classes of flows in a stream-aware fashion.

SUMMARY OF THE INVENTION

To address the wide variety of problems outlined above, one embodiment of the present invention provides a comprehensive redirection system for content distribution in a virtual overlay broadcast network (OBN). In this system, service nodes are situated at strategic locations throughout the network infrastructure, but unlike previous systems, these service nodes are coordinated across the wide area into a cohesive, coordinated, and managed virtual overlay network. Service node clusters peer with each other across IP tunnels, exchanging routing information, client subscription data, configuration controls, bandwidth provisioning capabilities and so forth. At the same time, the service nodes are capable of processing application-specific requests for content, e.g., they might appear as a. Web server or a streaming-media server depending on the nature of the supported service. In short, a service node has a hybrid role: it functions both as a server as well as an application-level content router.

In an embodiment of the present invention, an improvement to a packet-switched network is provided. The packet-switched network includes addressable routers for routing packet traffic, wherein a packet of data is routed from a source node to a destination node based on address fields of the packet. The improvement comprises a redirector coupled to at least one of the addressable routers and includes logic for accepting a service request from a client, logic for determining a selected server for handling the service request, the selected server being one of a plurality of servers that can handle the service request, and logic for generating a redirection message directed to the client for redirecting the service request to the selected server.

DESCRIPTION OF THE SPECIFIC EMBODIMENTS

Figure 1:
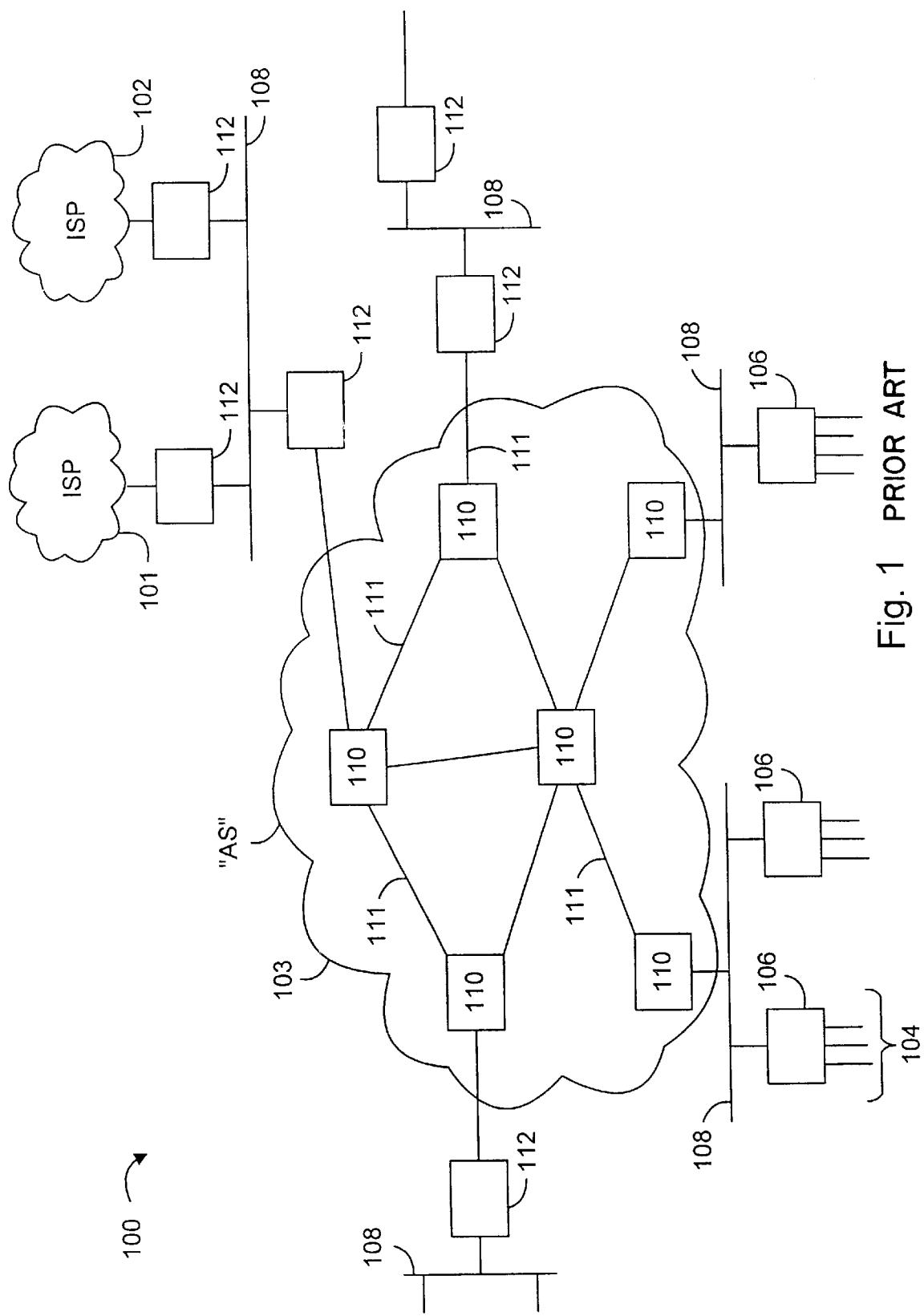
FIG. 1 shows an example of typical components and interconnections that comprise a portion of Internet connectivity.

The comprehensive redirection system of the present invention operates in tandem with service nodes situated at strategic locations throughout the network infrastructure that are coordinated across a wide area into a cohesive, coordinated, and managed virtual overlay network. The overlay network architecture is based on a design philosophy similar to that of the underlying Internet architecture, e.g., it exploits scalable addressing, adaptive routing, hierarchical naming, decentralized administration, and so forth. Because of this, the overlay architecture enjoys the same high degree of robustness, scalability, and manageability evident in the Internet itself. Unlike a physical internetwork, where routers are directly attached to each other over physical links, service nodes in the virtual overlay network communicate with each other using the packet service provided by the underlying IP network. As such, the virtual overlay is highly scalable since large regions of a network (e.g., an entire ISP's backbone) composed of a vast number of individual components (like routers, switches, and links) might require only a small number of service nodes to provide excellent content-distribution performance.

Another important aspect of the present invention is the 'glue' interface between clients that desire to receive information content and the service nodes that actually deliver it. That is, the 'glue' interface is a mechanism by which the client can attach to a service node, request a particular piece of content, and have that content delivered efficiently. This is sometimes referred to as the service rendezvous problem.

Fundamentally, service rendezvous entails a system by which it is possible to: (1) publish a single name for a service; (2) replicate the service throughout the network; and (3) have each client that desires the service receive it from the most appropriate server. To scale to millions of clients, the service rendezvous mechanism must efficiently distribute and load-balance client requests to the service nodes spread across the wide area. Moreover, to efficiently utilize network bandwidth, content should flow over the minimum number of network links to reach the requesting client. Both these points argue that clients should be directed to a nearby service node capable of serving the request. If there is no nearby service node capable of servicing the request, the system should be able to redirect the client to a service node elsewhere in the network across the wide area to service the request. Furthermore, it should be possible to cluster service nodes at a particular location and have the clients connect to individual nodes within a cluster based on traffic load conditions. In short, the service rendezvous system should provide a mechanism for server selection and should utilize redirection to effectuate load balancing to achieve the desired result. In cases where a local cluster becomes overloaded, the server selection should compensate to load balance across the wide area.

Unfortunately, service rendezvous is a difficult problem, because the Internet architecture deliberately hides the underlying structure of the network to impose flexibility and robustness upon higher-layer protocols, so it is difficult to discover and use a selected server for a particular network transaction. To overcome these problems, the rendezvous service described herein exploits "anycast" routing, a network-level mechanism that can be used to route user requests to nearby service nodes based on topological locality.

The concept of anycast packet forwarding is well known in network research literature; yet the concept remains narrowly applied in practice because of compatibility issues with existing packet forwarding networks. In general, operation of the Internet conforms to consensually agreed upon standards. The standards are set out in documents referred to as "requests for comments" (RFC). The RFCs applicable to Internet operation include RFC-1546 and others.

At the highest level, there are two primary approaches to implementing anycast packet forwarding. The first approach is to introduce a special type of anycast address and to create new routing protocols and service interfaces that are "anycast aware." This obviously would entail the lengthy process of standardization, adoption by router vendors and so forth. The second approach is to reuse a piece of the existing unicast address space. However, this second approach has two corresponding technical challenges which to this point have been unresolved. The challenges are that of: (1) supporting stateful transport protocols; and (2) supporting interdomain anycast routing and route aggregation. Fortunately, embodiments of the present invention offer novel solutions to these technical challenges. For example, a solution to the problem of supporting stateful transport protocols is provided in a section of this document entitled "Stateful Anycasting." A solution to the problem of supporting interdomain anycast routing and route aggregation is provided in a section of this document entitled "Interdomain Anycast Routing."

The rendezvous service described herein assumes that the underlying packet forwarding is not "anycast aware." However a system based upon "anycast aware" network is viable as well. Anycast packet forwarding is used to forward packets from a client to the nearest instance of the rendezvous service.

Instead, one embodiment of the present invention simplifies the anycast service model from a fully dynamic framework (where hosts can join and leave anycast groups dynamically) to a statically provisioned framework (where only specially configured hosts within the network infrastructure are members of an anycast group). In this statically provisioned framework, the assignment, allocation, and advertisement of anycast addresses to a central authority and associates a large block of anycast addresses with a single, well-connected backbone network. The backbone network can be referred to as the content backbone (CBB).

Another advantage included in embodiments of the present invention is that clients attach to the content distribution network at explicit, per-client service access points. This allows the infrastructure to perform user-specific authentication, monitoring, customization, advertising, and so forth. In contrast, an approach based on pure multicast, albeit scalable, provides none of these features since the multicast receiver subscription process is completely anonymous.

In summary, a virtual overlay network built using anycast-based service rendezvous enjoys the following attractive properties:

The service access mechanism is highly scalable, since the closest service node is discovered using anycast, which can be accomplished with standard routing protocols deployed in novel configurations;

The system offers substantial bandwidth savings, since requests may be routed to the nearest service node, thereby minimizing the number of network links that content must flow across;

The service infrastructure provides fine-grained control, monitoring, and customization of client connections;

The administration and configuration of the infrastructure is highly decentralized, facilitating large-scale deployment across heterogeneous environments managed by a diverse range of administrative entities;

The system affords very high availability and robustness when anycast is built on standard adaptive routing protocols and the service elements are clustered for redundancy, thus ensuring that requests are routed only to servers that are properly functioning and advertising their availability; and The content broadcast network is incrementally deployable, since the anycast-based redirection service can first be built into the content broadcast backbone and then built out into affiliate ISPs on an individual basis to track growing user demand.

In the following sections of this document, the details of the architectural model and embodiments of various system components used to implement the anycast-based redirection system for the virtual overlay broadcast network included in the present invention are described.

Network Architecture

FIG. 1 shows an example of typical components and interconnections that comprise a portion of the Internet 100. Internet service providers (ISPs) 101, 102 and 103 provide Internet access. A typical ISP operates an IP-based network across a wide area to connect individual customer networks 104 and/or individual users to the network via access devices 106 (e.g., DSL, telephone modems, cable modems, etc.). The typical ISP also peers with other ISPs via exchange points 108 so that data traffic can flow from a user of one ISP to a user of another ISP. A collection of internal IP routers 110 interconnected with communications links 111 provide connectivity among users within an ISP. Specialized border routers 112 situated at the exchange points forward non-local traffic into and out of the ISP. Often, an individual ISP network, such as ISP 103, is called an autonomous system (AS) because it represents an independent and aggregatable unit in terms of network routing protocols. Within an ISP, intradomain routing protocols run (e.g., RIP or OSPF), and across ISPs, interdomain routing protocols run (e.g., BGP). The term "intradomain protocol" is often used interchangeably with the term interior gateway protocol (IGP).

As the Internet and World Wide Web (Web) have grown, ISPs realized that better end-to-end network service performance could be attained by combining two innovative architectural concepts in concert, namely: (1) aggressively peering with a large number of adjacent ISPs at each exchange point; and (2) co-locating data centers containing application services (e.g., Web servers) near these exchange points. The "co-location facility" (colo) at each peering point thus allows application services to be replicated at each peering point so that users almost anywhere in the network enjoy high-speed connections to the nearby service.

Figure 2:
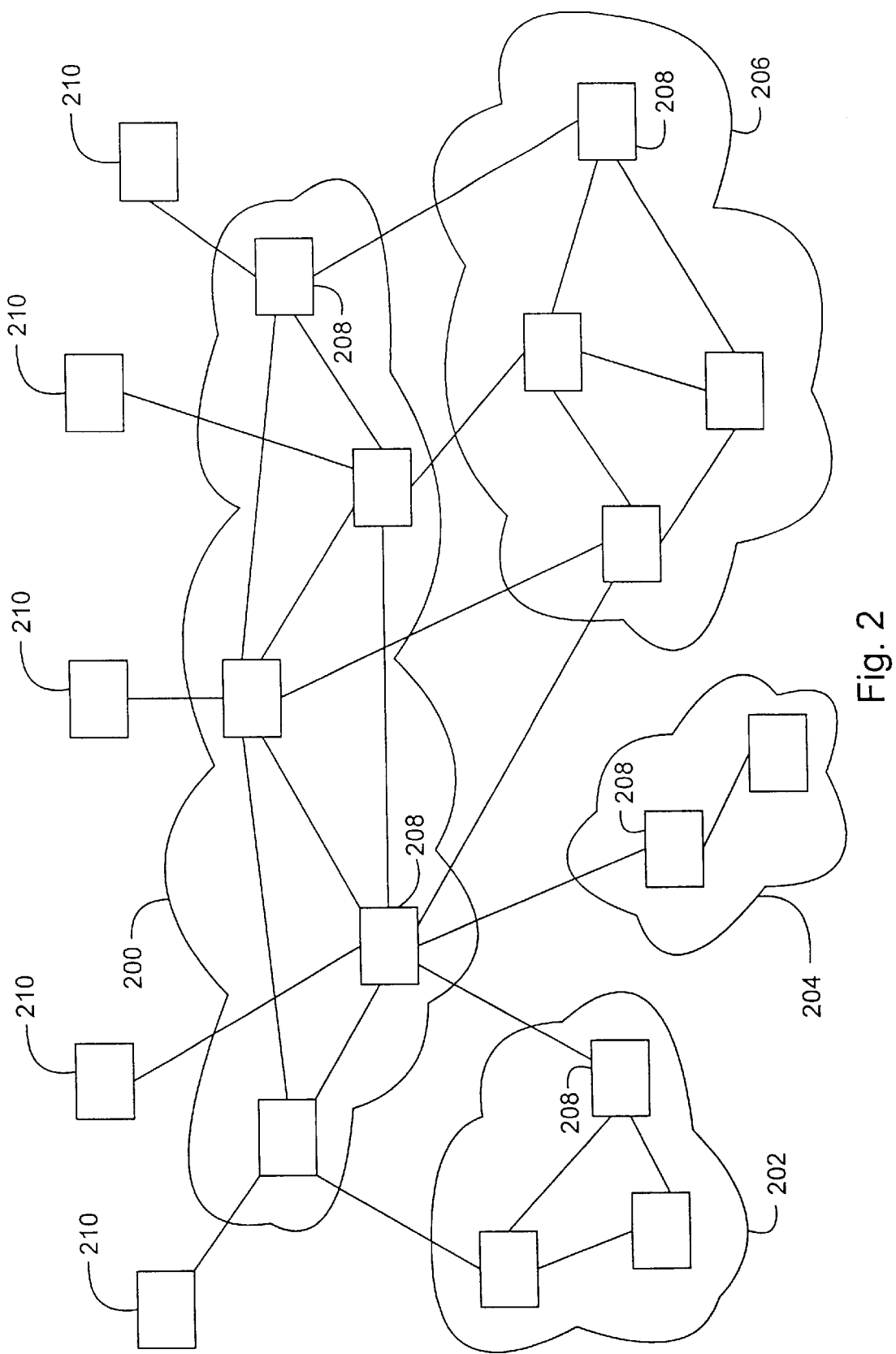
FIG. 2 illustrates a typical Overlay ISP model.

FIG. 2 illustrates a typical architecture for an Overlay ISP 200, since a service network so built, forms an overlay structure across a large number of existing ISPs, for example, ISPs 202, 204 and 206. The Overlay ISP 200 couples to the existing ISPs via routers 208 and further couples to data centers (DC) 210. Overlay ISPs rent machine space and network bandwidth to content providers that place their servers in colo's located at the DCs.

To summarize, a natural building block for the CBB is the ISP colo. In embodiments of the present invention, service nodes are housed in colo's and arranged into an overlay structure across the wide area using the available network connectivity. However, service nodes need not be situated in the specialized colo sites, and in fact, can exist in any part of the network. The colos are a convenient and viable deployment channel for the service nodes.

Interdomain Anycast Routing

Figure 3:
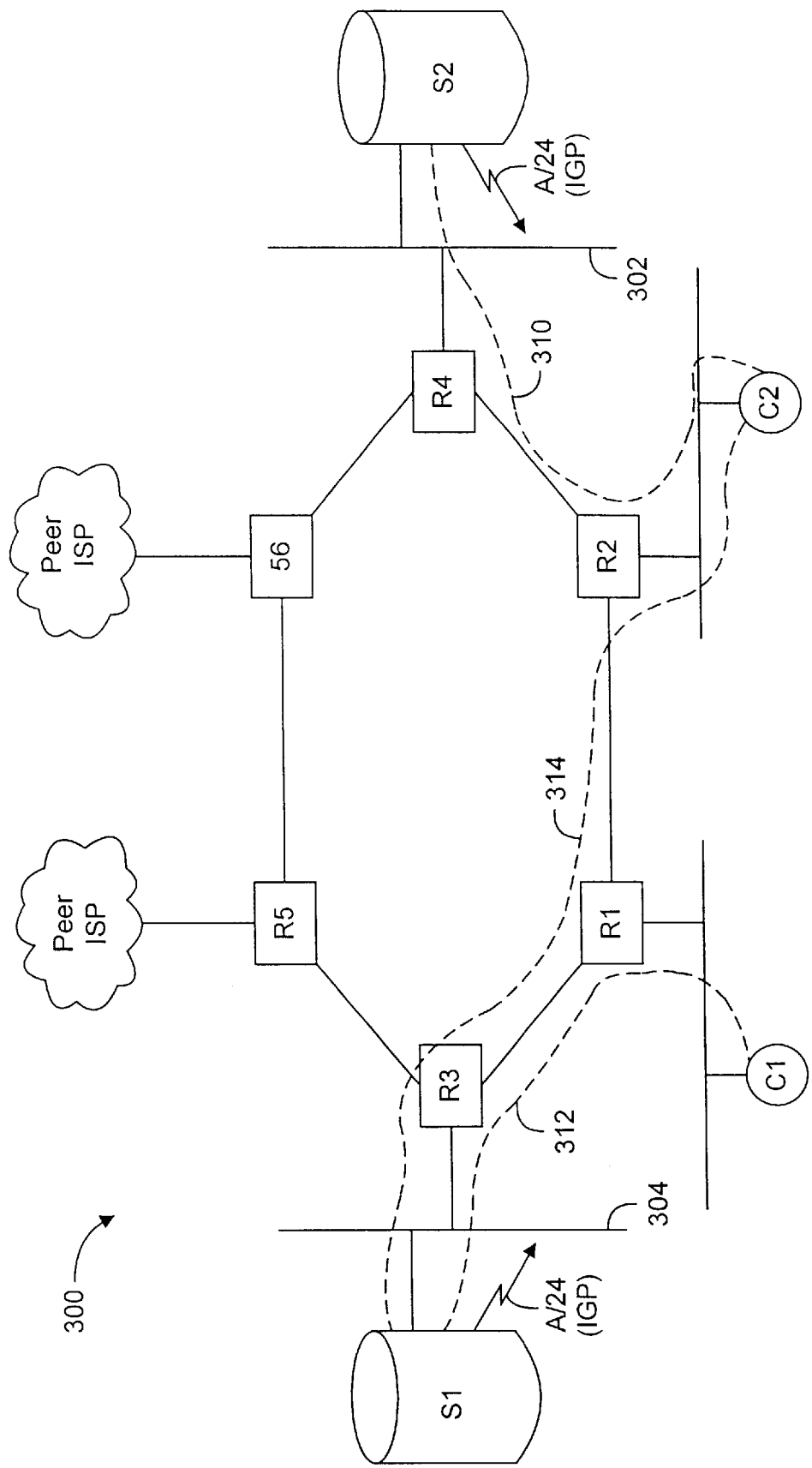
FIG. 3 shows a network portion 300 used to implement an anycast routing scheme in accordance with the present invention.

FIG. 3 shows a network 300 configured to implement anycast routing in accordance with the present invention. The network 300 comprises routers (R1–R6), two server devices $S_1$ and $S_2$, and two clients $C_1$, and $C_2$. In one embodiment of network 300, both server devices advertise reachability to the address block "A/24 " (i.e., A is a 24-bit prefix for a 32-bit IPv4 address) via IGP. Thus, the two server devices utilize the routing advertisements to reflect server availability into the infrastructure of the network 300. Routers $R_4$ and $R_3$ are configured to listen to these reachability advertisements on their attached LANs 302 and 304, respectively. As a result of the IGP computation, the routers R1–R6 in the network learn the shortest-path from each client to the servers via addresses that fall within the "A" prefix. Thus, if client $C_2$ sends a packet to address $A_1$ (where the prefix of $A_1$ is A), then router $R_2$ will forward it to router $R_4$, which in turn forwards it to server $S_2$, as shown at path 310. Similarly, packets sent to $A_1$ from client $C_1$ are routed to server $S_1$, as shown at path 312. If server $S_2$ fails, then advertisements from $S_2$ for A/24 will cease and the network will re-compute the corresponding shortest-path routes to A/24. Consequently, packets sent from $C_2$ to $A_1$ are routed to server $S_1$, since there is no other node advertising such a route, as shown at path 314.

One of the problems posed by the anycast routing scheme described above is how anycast routes are propagated across the wide area to arbitrary sites that might not be configured with anycast-based service nodes. Rather than require a new infrastructure for anycast routing, embodiments of the present invention simply leverages the existing interdomain routing system with a framework in which a single AS "owns" a given anycast address block and advertises it using its normal interdomain protocol, i.e., BGP. Then, other independent AS's can be incrementally configured with anycast-aware service nodes, such that the IGP for those AS's routes packets sent to the anycast address block in question to the service nodes within that single AS.

To do this, the content backbone (CBB) is situated at the "master" AS, which owns the anycast address block and advertises it to the Internet using BGP. That is, an ISP carves out a block of its pre-existing but unused address space (or requests new addresses from the Internet Assigned Numbers Authority) and assigns this block to the CBB, which declares that this block of addresses is to be used for nothing but anycast routing. The master AS advertises the anycast block—call this block "A"—across the wide area, again using BGP as if it were a normal IP network. Thus, in the configuration described so far, any packet sent to an address in block A from anywhere in the Internet is routed to the master AS.

To provide the services that underlie the anycast routing infrastructure, the CBB deploys service nodes in the master AS and arranges for those nodes to advertise reachability for A using the master AS's IGP. Once this piece is in place, when a packet enters the master AS (from anywhere on the Internet), it is routed to the CBB service node that is closest to the border router traversed by the packet upon entering the master AS. Assuming the master AS is densely peered, then most users on the Internet will enjoy a low-delay, high-speed path to a service node within the master AS (CBB).

Though the architecture described thus far provides a viable mechanism for proximity-based service-node location for nodes that are situated within the master AS, the system is limited by the fact that all service nodes reside in that master AS. A more scalable approach would allow service nodes to be installed in other ISP's networks. To do so, an affiliate AS—that is, an ISP that supports the rendezvous service but is not the master AS, simply installs service nodes in exactly the same fashion as the master AS. However, the affiliate advertises the anycast block only within its domain using its IGP; it does not advertise the anycast block outside its domain to its peers. In another embodiment, an extension to this scheme is provided in which multiple AS's do advertise the anycast block in BGP (i.e. their exterior routing protocol). That extension is described in another section of this document.

Figure 4:
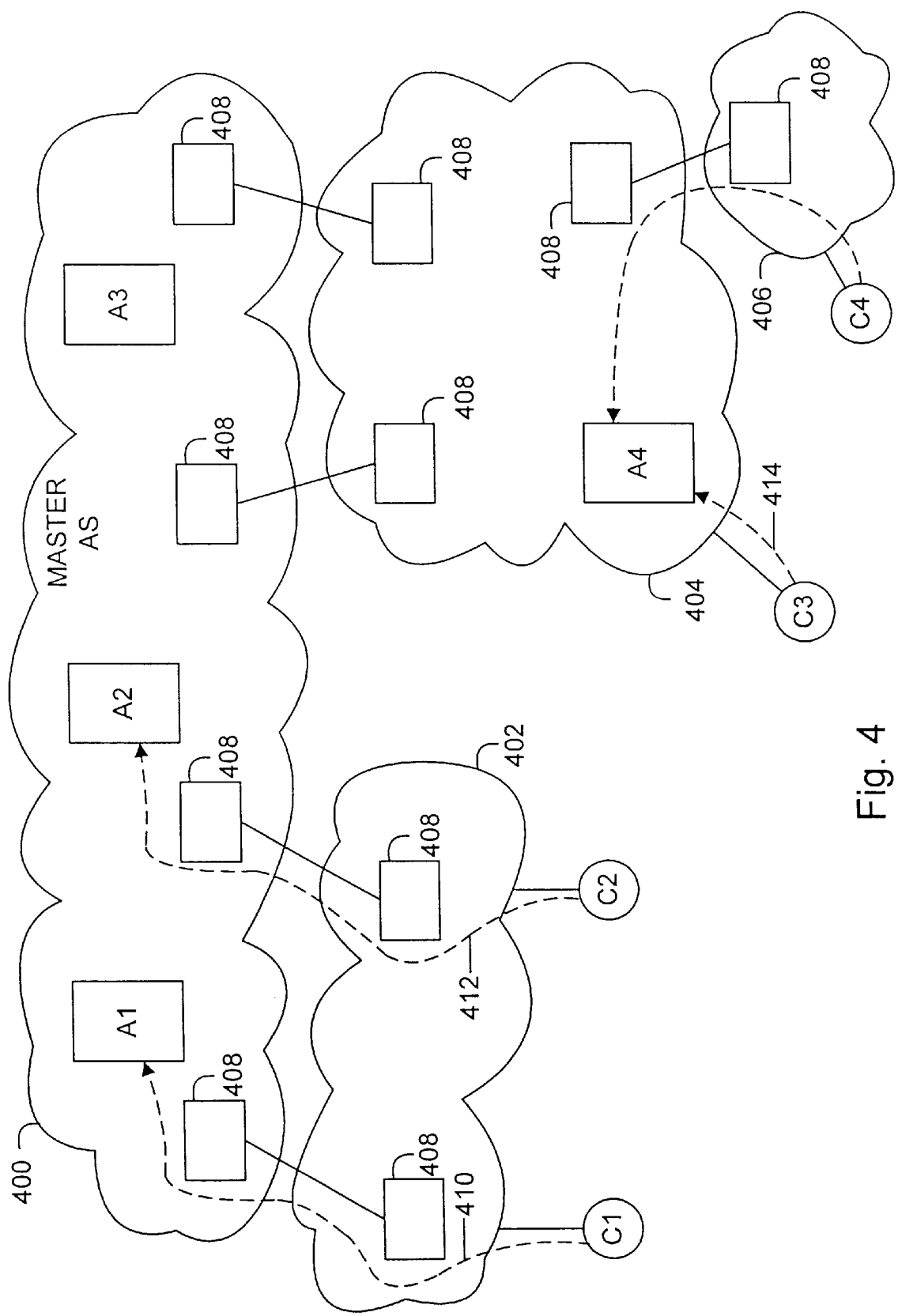
FIG. 4 shows a master and affiliate networks configured to accomplish interdomain anycast routing.

FIG. 4 shows a master AS 400 and affiliate networks 402, 404 and 406 configured to accomplish interdomain anycast routing. The master AS 400 comprises anycast-based service nodes $A_1$, $A_2$, and $A_3$, and couples to the three affiliate networks via routers 408. Four clients $C_1$, $C_2$, $C_3$, and $C_4$ attach to the affiliates as shown. Affiliates 402 and 406 have no service nodes deployed therein, while affiliate 404 has a single service node $A_4$ configured into its infrastructure. Thus, given the normal behavior of unicast inter- and intra-domain routing protocols, packets sent to block A from $C_1$ are sent to $A_1$, as shown by path 410, while packets sent to block A from $C_2$ are routed to $A_2$, as shown by path 412. The paths 410 and 412 represent the shortest interdomain paths from the affiliate 402 to the master AS 400. In contrast, packets sent to block A from client $C_3$ are routed to service node $A_4$, as shown by path 414. This occurs since the IGP in the affiliate 404 will cause the service node $A_4$ to advertise reachability to block A and thus "hijack" packets sent to that address. Likewise, packets sent to block A from $C_4$ will also be "hijacked" by $A_4$, as shown by path 416, since the path from the affiliate 406 to the master AS 400 traverses the affiliate 404. This is a deliberate and desirable feature of the architecture in accordance with the present invention, since it scales and distributes the load of the system without requiring anycast intelligence to be deployed everywhere for correct operation.

Although the anycast addressing and routing architecture provides a framework for scalable service rendezvous, ownership of the anycast address space is preferably centralized at the CBB and/or master AS. While this limits the overall flexibility of the solution to a degree, it has the benefit of centralizing the management of the address space. In this model, when content providers sign up with the CBB, they are assigned an exclusive anycast address space from the CBB's block of available addresses. In turn, the content providers use this anycast address space in references to their services, e.g., as the host part of a uniform resource locator (URL). Thus, users that click on such Web links are directed to the closest service node in the CBB or its affiliates.

Naming and Service Discovery

Once a service node receives an anycast request for service, the service must be instantiated on behalf of the requesting client. That is, the service request must be satisfied locally (if an extension of the master service is locally available), or it must be initiated from the master service site. One method to locate the service at the master site is to iteratively apply the anycast routing architecture from above. Yet, an attempt to send an anycast packet to the anycast address in question will fail because the packet will be routed back to the host it came from. In other words, the anycast packet is trapped in the domain that received it. Thus, the system must rely upon some other mechanism for communicating between the remote service node and the master service site.

In one embodiment the service node queries some database to map the anycast address back to the master service site, or even to a set of sub-services that are related to the service being offered. Fortunately, a distributed database to perform this type of mapping in a highly scalable and robust fashion already exists. The Domain Name System (DNS), which handles IP host name-to-address mappings in the Internet at large, can be easily reused and configured for this purpose. More specifically, RFC-2052 defines a scheme for defining arbitrary service entries using the DNS service (SRV) resource records. By translating the numeric anycast address into a DNS domain name according to some well-defined, deterministic algorithm, a service node can determine the location of services using DNS queries keyed by this anycast name. The required DNS configuration may be carried out by the CBB, or the CBB may delegate authority to configure the DNS subdomain for a particular anycast block to the original content provider, thereby allowing that provider to configure and manage the offered services as it sees fit.

An alternative method is to assign only a single anycast address to a CBB and embed additional information about the content originating site in the client URL. That is, anycast routing is used to capture client requests for any content published through the CBB, while additional information in the URL is used to identify the particular location or other attributes for the content in question. In the remainder of this disclosure, the former method (wherein multiple anycast addresses are assigned to a CBB) is assumed for illustrative purposes, however, it would be apparent to one with skill in the art how the system could be simplified so that only a single anycast address were assigned to each CBB.

To summarize, the service rendezvous problem is solved in a scalable fashion with two interdependent mechanisms: (1) clients bind to the service infrastructure using anycast addresses and routing; and (2) service nodes bind to the master service site using auxiliary information conveyed explicitly via client URLs or implicitly through a distributed directory like DNS. Excellent scaling performance results by virtue of proximity-based anycast routing and the caching and hierarchy that are built into the DNS.

Stateful Anycasting

One of the difficulties in implementing an anycast service on top of the IP packet service is the dynamic nature of the underlying routing infrastructure. Because IP allows packets to be duplicated and routed along different paths (among other things), packets sent using the anycast service, may be delivered to multiple anycast service nodes simultaneously or consecutive packets may be delivered to one service node, and then another, intermittently.

This is especially problematic for transport-layer protocols like TCP, which assume that the end points of the communication channel are fixed. As an example, consider a TCP connection to a service node via an anycast address. Suppose half way through the connection, the anycast route changes so that the client's packets are suddenly routed to a different service node. However, that new service node has no knowledge of the existing TCP connection, so it sends a "connection reset" back to the client. This breaks the connection, which may result in a disruption of the service that the client was invoking. The crux of the problem is that TCP connections are stateful while IP is stateless.

A fair amount of research has dealt with this problem, but none of the research has produced a solution adequate for use with the present invention. It may be possible to change the TCP protocol in a way that would circumvent this problem. But changing the entire installed base of millions of deployed TCP stacks in the Internet is next to impossible. Other approaches have advocated methods where routers pin down state within the network to ensure that an anycast TCP connection remains on its original path. This is impractical as well because it involves upgrading all routers in the Internet infrastructure and the work is still very much in the research stage.

In an embodiment of the present invention, a novel scheme called stateful anycasting is employed. In this approach, the client uses anycast only as part of a redirection service, which by definition, is a short-lived ephemeral transaction. That is, the client contacts an anycast referral node via the anycast service, and the referral node redirects the client to a normally-addressed and routed (unicast) service node. Thus, the likelihood that the redirection process fails because the underlying anycast routes are indeterminate is low. If this does occur, the redirection process can be restarted, either by the client, or depending on context, by the new service node that has been contacted. If the redirection process is designed around a single request and single response, then the client can easily resolve any inconsistencies that arise from anycasting pathologies.

If a service transaction is short-lived (e.g., the data can be transferred in some small number of round-trip times), then the need for redirection is limited. That is, short Web connections could be handled in their entirety as a TCP anycast connection. On the other hand, long-lived connections like streaming media would be susceptible to routing changes, but the stateful anycasting would minimize the probability that a route change could cause a problem (i.e., the change would have to occur during the redirection process). Yet if an anycast based infrastructure is widely deployed, then application vendors will have incentive to provide support for the anycast service; if so, a client could be modified to transparently re-invoke the anycast service if a routing transient caused any sort of service disruption.

In another embodiment, the adverse effects of routing transients are minimized by carefully engineering the operating policies of the infrastructure. Thus, a large-scale anycasting infrastructure may be built as described herein where dynamic routing changes are fairly infrequent and thus, in practice, the problems induced by the statelessness of IP with regard to anycast are minimized. In short, the stateful anycasting method described herein could provide for a highly available, robust, and reliable service-rendezvous system.

A Proximity-based Redirection System

Given the above described architectural components, this section describes an embodiment of the present invention for an anycast-based redirection service that combines these components. Some of the components of this design are clearly generalizable to a variety of useful configurations and deployment scenarios and are not limited by the specific descriptions herein. Other mechanisms are specifically suited for a particular service like streaming media broadcast or Web content delivery.

The proximity-based redirection system provides a service node attachment facility for an arbitrary content delivery network by: (1) allowing arbitrary application-specific redirection protocols to be used between the client and the service; and (2) providing the glue between the redirection service, the client, the master service site, and the CBB.

The CBB owns a particular anycast address space rooted in the master AS. Each content provider is assigned one or more anycast addresses from the anycast address space. Because arbitrary services can be bound to an anycast address using DNS, only one address is required for each distinct content provider. For illustrative purposes, we will assume that a canonical content provider's DNS domain is "acme.com" and the CBB's is "cbb.net". The anycast address block assigned to the CCB is 10.1.18/24 and the address assigned to acme.com is 10.1.18.27. It is further assumed that the content provider (acme.com) generates Web content, on-demand streaming media content, and live broadcast content.

The following sections describe the components that comprise the local architecture (defined within a colo), the components that comprise a wide area architecture (defined between and across ISPs), and one specific redirection algorithm based on these architectures and the general principles that underlie them in accordance with the present invention.

The Local Architecture

This section describes the arrangement of devices to support a proximity-based redirection service within a particular ISP, e.g., inside a colo, and how those devices are configured and interfaced to external components.

The content delivery architecture decomposes naturally into two interdependent yet separable components: (1) the control and redirection facility; and (2) the actual service function. That is, a service is typically invoked by a control connection that in turn triggers the delivery of the service across a data connection. Moreover, control connections typically are amenable to being redirected to alternate IP hosts. Thus, the high-level model for the system is as follows:

a client initiates a control connection to an anycast address to request a service;

an agent at the termination point for that anycast dialogue redirects the client to a fixed service-node location (i.e., addressed by a standard, non-anycast IP address); and the client attaches to the service through the control connection to this fixed location and initiates the service transfer.

The requirements placed on the control and data handling components are vastly different. For example, the control elements need to handle a large number of ephemeral requests and quickly redirect the requests, while the service elements need to handle a sustained load of persistent connections like streaming media. Also, the management requirements for these two device classes are quite different as is the system's sensitivity to their failure modes. For example, the control elements must manage the server resources, so that considerations such as load balancing are factored into server selection. In this regard, the control elements are capable of monitoring "server health" to determine which servers to redirect clients to. For example, server health is based on various parameters, such as, server capacity, loading, anticipated server delays, etc., that may be monitored or received indirectly by the control elements and used to make server selection decisions.

Figure 5:
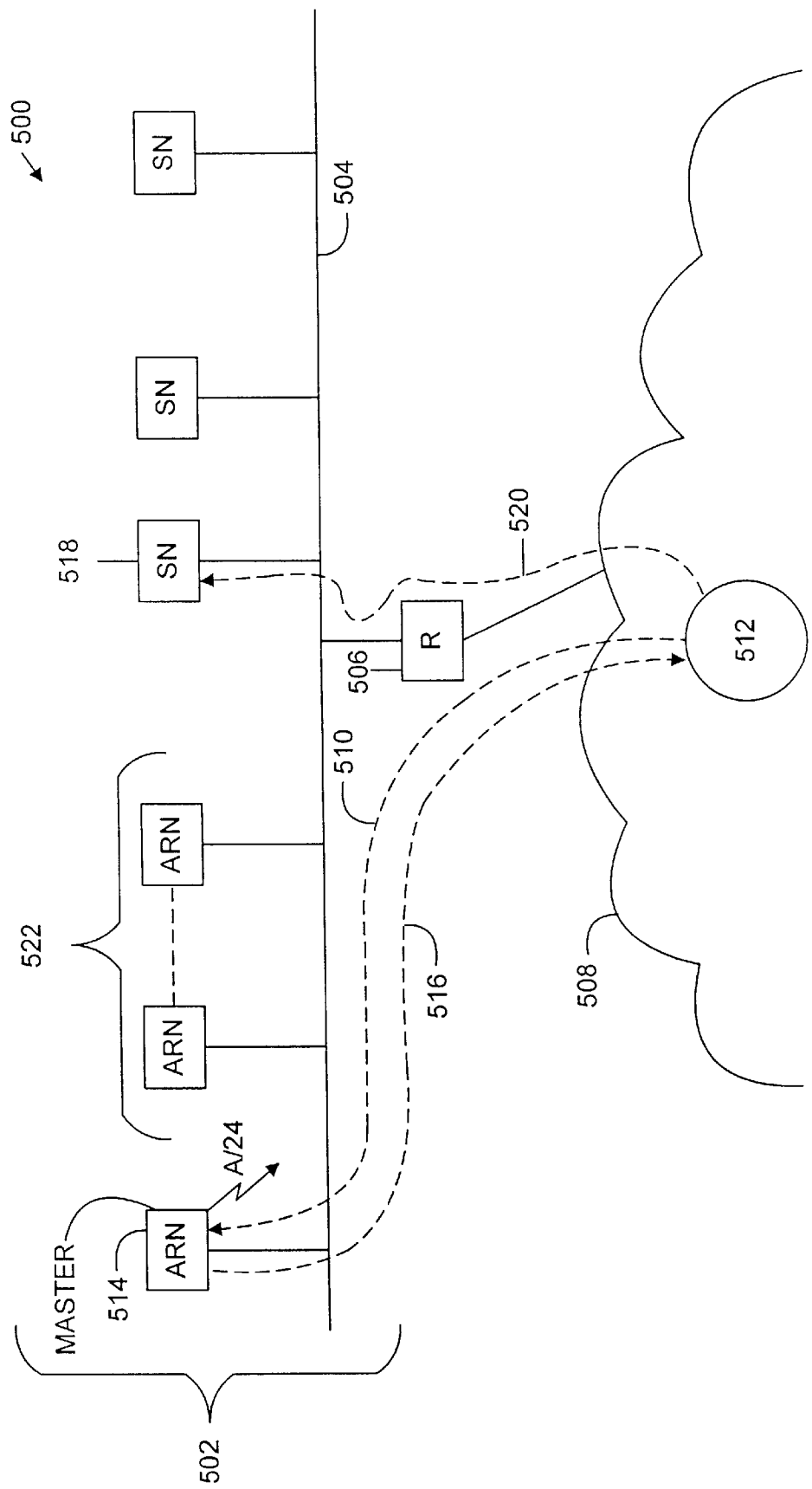
FIG. 5 shows how control and service functions included in the present invention are separated within a particular ISP.

FIG. 5 shows an embodiment of the present invention that demonstrates how control and service functions are separated within a particular ISP to meet the requirements outlined above. In this embodiment, a service cluster 502 of one or more service nodes (SN) and one or more anycast referral nodes (ARN) are situated on a local-area network segment 504 within a colo 500. The network segment 504 couples to a colo router 506 that in turn, couples to the rest of the ISP and/or the Internet 508.

Under this configuration, a client request 510 from an arbitrary host 512 in the Internet 508 is routed to the nearest ARN 514 using proximity-based anycast routing. The ARN 514 redirects the client (path 516) to a candidate service node 518 (path 520) using the range of techniques described herein. This service model scales to arbitrary client loads because the service nodes are clustered, which allows the system to be incrementally provisioned by increasing the cluster size. In addition, the ARNs themselves can be scaled with local load-balancing devices like layer-4 switches.

At any given time, one of the ARNs is designated as the master, for example, ARN 514, while the others are designated as backups 522. This designation may change over time. These agents may be implemented in individual physical components or may all run within one physical device. It will be assumed that in this example, the SN's and ARN's are attached to a single network segment 504 via a single network interface, though the system could be easily generalized such that these agents and physical devices operate across multiple local-network segments. Each ARN is capable of advertising routing reachability to the anycast address space owned by the service-node infrastructure, but only the master ARN actively generates advertisements. Likewise, the ISP's colo router(s) 506 attached to the network segment 504 are configured to listen to and propagate these advertisements. This exchange of routing information is carried out by whatever IGP is in use within that ISP, e.g., RIP, OSPF, etc. In the preceding example a single ARN is elected master for all anycast addresses, and the other ARNs serve as backups. An alternative embodiment a master is elected for each anycast address. This would allow load to be distributed among multiple active ARNs, each serving a disjoint set of anycast addresses. The failure of any ARN would start the election process for its anycast addresses.

There are two key steps to bootstrapping the system: (1) the ARN(s) must discover the existence and addresses of service nodes within the SN cluster; and (2) the ARN(s) must determine which service nodes are available and are not overloaded. One approach is to configure the ARNs with an enumeration of the IP addresses of the service nodes in the service cluster. Alternatively, the system could use a simple resource discovery protocol based on local-area network multicast, where each service node announces its presence on a well-known multicast group and each ARN listens to the group to infer the presence of all service nodes. This latter approach minimizes configuration overhead and thereby avoids the possibility of human configuration errors.

With this multicast-based resource discovery model, a new device is simply plugged into the network and the system automatically begins to use it. The technique is as follows:

The ARN(s) subscribe to a well-known multicast group $G_s$.

The SN(s) in the service cluster announce their presence and optional information like system load by sending messages to group $G_s$.

The ARN(s) monitor these messages and build a database of available service nodes, storing and updating the optional attributes for use in load balancing and so forth.

Each database entry must be "refreshed" by the corresponding SN, otherwise it is "timed out" and deleted by the ARN(s).

Upon receipt of a new service request, the ARN selects a service node from the list of available nodes in the database and redirects the client to that node.

Note that since all the devices in the service cluster are co-located on a single network segment or LAN, the use of IP multicast requires no special configuration of routing elements outside of, or attached to, the LAN.

Fault Recovery

The nature of the protocols described thus far were designed to perform automatic fault recovery and thus engender a very high degree of availability for the service. The system is robust to both ARN failure as well as SN failure.

Because the ARN "times out" the SN database entries, SN's that fail are not used for service requests. Thus, if a client reconnects to the service (either transparently to the user or with user interaction), the service is restarted on another service node. If the ARN keeps persistent state about the client, then the system can potentially resume the old service incarnation rather than starting a new one from scratch (e.g., so, for example, the user is not billed twice when SN failure detection and handoff occurs).

Another problem can occur if the ARN fails. By maintaining redundant ARNs in a single colo, this problem can be resolved using the following technique:

Each ARN subscribes to a well-known multicast group $G_s$;

Each ARN announces its existence by sending an announcement message to group $G_s$;

Each ARN builds a database of active ARN peers and times out entries that are not refreshed according to some configurable period that is greater than the interannouncement period; and The ARN with the lowest numbered network address (i.e., the ARN with a network address less than all other ARN's in the database) elects itself as the master ARN and begins to advertise reachability to the anycast address block via the IGP.

Thus, if the master ARN fails, the backup ARNs learn of this condition very quickly (after a single announcement interval) and a new master ARN is elected. At that point, as a side effect of the new IGP route advertisements, anycast packets are routed to the new master ARN by the colo router.

Wide-area Architecture

Having described the local-area architecture of the devices within a single colo installation, a description of a wide-area architecture will be provided which includes how the individual service-node clusters are coordinated and managed across the wide area. There are two main wide-area components for realizing embodiments of the content overlay network included in the present invention, namely:

a data service, which involves the routing and management of vast amounts of data from originating content sites to the service nodes in the colos; and a solution to the anycast-based service rendezvous problem, which involves binding the services requested by clients to the originating master site.

How the former problem is solved—that is, how data is reliably and efficiently disseminated across the wide-area to service nodes is beyond the scope of this disclosure. For example, content might be carried by a streaming broadcasting network such as described in a pending U.S. Patent Application Serial No. 60/115,454, entitled "System for Providing Application-level Features to Multicast Routing in Computer Networks" filed on Jan. 22, 1999. Content might also be carried by a file dissemination protocol based on flooding algorithms like the network news transport protocol (NNTP).

This disclosure describes how the anycast-based redirection system interfaces with available content delivery systems. A novel framework is used in which service-specific interactions are carried out between the ARN, the SN, the client, and potentially the originating service or content site. For example, the client might initiate a Web request to anycast address A, which is routed to the nearest ARN advertising reachability to address A, which in turn redirects the client to a selected SN with a simple HTTP redirect message, or the Web request may be serviced directly from the ARN.

In one embodiment of the anycast-based redirection system, the ARN can "prime" the SN with application-specific information that is not capable of being conveyed to the SN from an unmodified existing client. Here, the ARN contacts an SN and installs some state Q bound to some port P. The port P may be allocated by the SN and returned to the ARN. Then, the client could be redirected to the SN via port P, so that the unmodified client implicitly conveys the state Q via the new connection. For example, Q might represent the wide-area broadcast channel address to which the service node should subscribe for a particular streaming media feed. Since the unmodified client is not directly protocol-compatible with the CBB infrastructure, the proper channel subscription is conveyed in the state transfer Q without having to involve the client in that dialogue.

To avoid having to modify a large, existing installed based of clients (like Web browsers and streaming media players and servers), the client-SN interactions are based on existing, service-specific protocols, e.g., HTTP for the Web, RTSP for streaming media protocols, or even other vendor-proprietary protocols.

Once a client request is initiated and intercepted by the ARN, some wide-area service must be invoked to pull the content down from the CBB into the local service node (if the content is not already present). As described earlier, an iterative use of anycasting will fail. Thus, the DNS system is used to map anycast addresses back to the services in a scalable and decentralized fashion.

For example, if it is desired to support caching of Web objects for the content provider "acme.com", and assuming the CBB assigns acme.com the anycast address 10.1.18.27, then a pointer to the master server can be configured into DNS with a SRV resource record such as:

anycast-10-1-18-24.http.tcp.cbb.net SRV www.acme.com

When a service node receives a client connection request on TCP port 80 (i.e., the standard HTTP Web port) to its anycast address 10.1.18.27, that service node can query the DNS SRV record for (anycast-10-1-18-27.http.tcp.cbb.net) to learn that the master host for this service is www.acme-.com. That knowledge can be locally cached and when the requested content is fetched from www.acme.com, it too can be locally cached. The next request to the same anycast address for the same content can then be satisfied locally. Note that the content stored on www.acme.com could have links that explicitly reference anycast-10-1-18-27.http.tcp.cbb.net or the site could employ a more user-friendly name, e.g., www-cbb.acme.com, that is simply a CNAME for the anycast name:

www-cbb.acme.com CNAME anycast-10-1-18-27.http.tcp.cbb.net

Consider another example where it is desirable to support a very large-scale streaming media broadcast also from acme.com. In addition to the master Web server, we might need to know the location of a "channel allocation service" (CAS) that maps streaming media URLs into broadcast channel addresses, where a channel address is akin to an application-level multicast group as described in No. 60/115454. In this case, we query the DNS for a SRV resource record that points to the CAS to obtain a record that might have the form:

anycast-10-1-18-24.cas.tcp.cbb.net SRV cas.acme.com

When the ARN receives a client connection request for a streaming media URL, it queries cas.acme.com to map that URL to the broadcast channel (and locally caches the result for future client requests), then subscribes to the channel over the CBB now that the channel address is known.

By storing service bindings in the DNS in this fashion, an arbitrary anycast service node can dynamically and automatically discover the particular services that are bound to a particular anycast address. There is no need to configure and update service nodes within the infrastructure with this knowledge. This greatly simplifies the configuration and management of the anycast-based service rendezvous mechanism and the content broadcast network at large.

As described above, the DNS SRV records store mappings from service names to corresponding server addresses. However, there may be cases where the ARN needs more information than a simple list of servers for a named service. The additional information might specify a service node selection algorithm, or might specify a service node setup procedure. In these cases, the information for the named service could be stored in a directory server (like LDAP or X.500) or on a network of web servers. When compared with DNS, these servers offer greater flexibility and extensibility in data representation.

The Redirection Algorithm

Given the above-described components and system architecture, an embodiment of the present invention is provided to demonstrate how an end-host invokes a service flow or transaction from the service-node infrastructure using stateful anycasting.

A user initiates a content request, e.g., by clicking on a Web link represented as a URL.

The client resolves the DNS name of the resource that the URL references. This name ultimately resolves to an anycast address that was administered by the authority (e.g., www.acme.com is a CNAME for any-10-1-18.27.cbb.net).

The client initiates a normal application connection using the anycast address, e.g., a Web page request using HTTP over TCP on port 80 or a streaming media request using RTSP over TCP port 554.

As a side effect of the anycast routing infrastructure described above, the client's packets are routed to the nearest ARN advertising reachability to the address, thereby initiating a connection to that ARN. The ARN is prepared to accept requests for each configured service, e.g., Web requests on port 80.

At this point, if the data is available and is of a transactional nature, then the ARN can either respond with the content directly or redirect the requesting client to a service node as follows:

The ARN selects a candidate service node S from its associated service cluster. The selection decision may be based on load and availability information that is maintained from a local monitoring protocol as described above.

The ARN performs an application-specific dialogue with S as necessary in preparation for the client C to attach to S. For example, in the case of live broadcast streaming media, the ARN might indicate the broadcast channel upon which S should tune in to via a request to the CBB overlay network. As part of this dialogue, S may return information to the ARN that is required to properly redirect C to S. Whether this information is present and the nature of that information is specific to the particular service requested.

The ARN responds to the original client request with a redirection message that refers the client C to the service node S selected above.

The client C contacts S, in a client-specific fashion, to initiate the flow or content transaction associated with the service desired. For instance, the client may connect to S using the streaming media control protocol RTSP to initiate a live transmission of streaming media over RTP.

Active Session Failover

One disadvantage of the stateful anycasting redirection scheme described above is that if the selected service node fails for some reason, all clients fed by that node will experience disrupted service. If the client is invoking a sustained service like a streaming-media feed, the video would otherwise halt and the client would be forced to retry. In an alternative embodiment, the client may be modified to detect the service node failure and re-invoke the redirection process before the user notices any degradation in service, a process herein called "active session failover".

Figure 6:
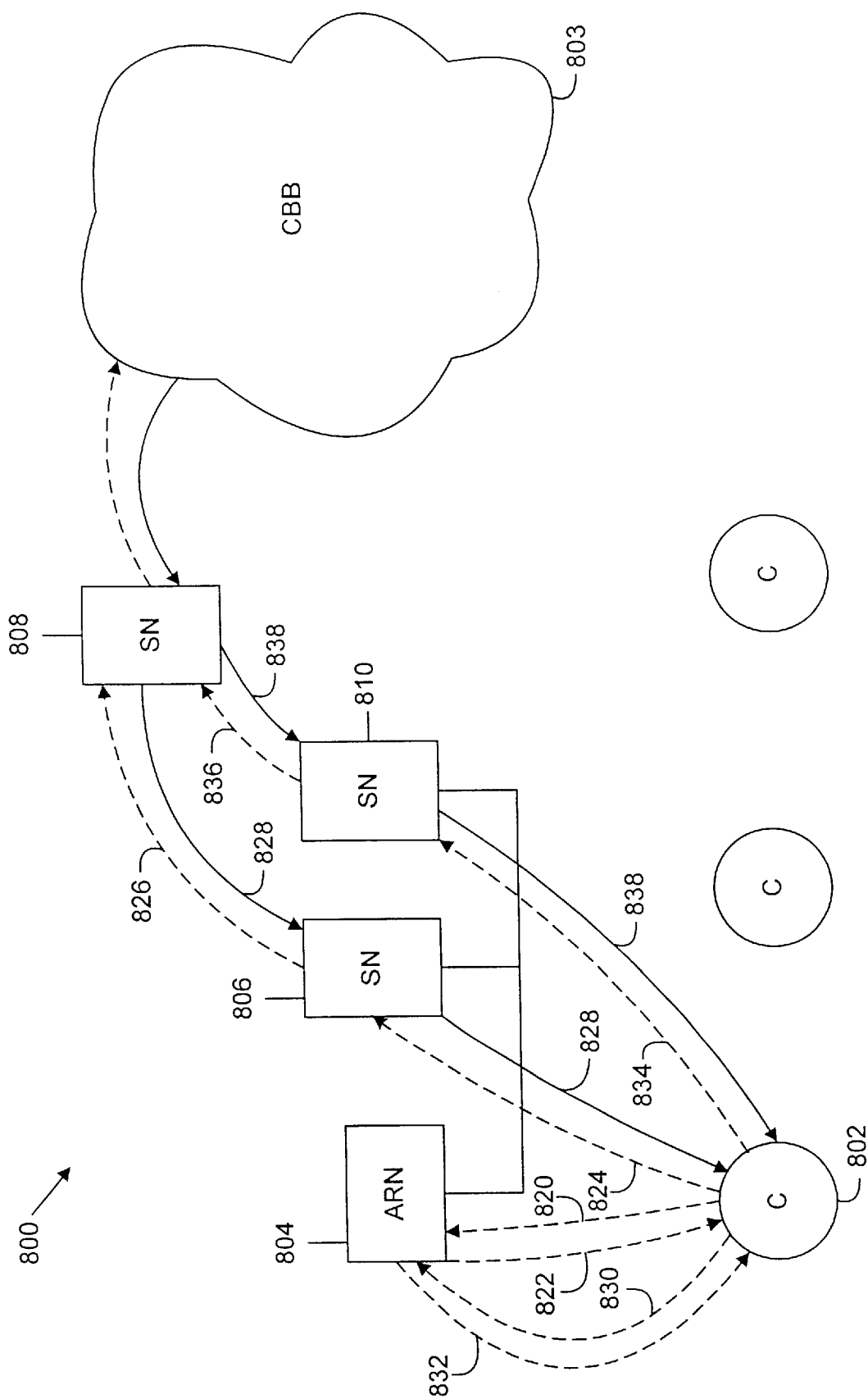
FIG. 6 shows a portion of a data network constructed in accordance with the present invention to implement active session failover.

FIG. 6 shows a portion of a data network 800 constructed in accordance with the present invention. The data network 800 shows network transactions that demonstrate how active session failover operates to deliver content to a client without interruption.

Initially, a client 802 sends a service request 820 to the anycast address A, which is routed to ARN 804. The service request 820 requests content originating from a CBB 803. The ARN 804 decodes the request to determine the application specific redirection message to be sent to the client 802. The redirection message 822 transmitted by the ARN 804, redirects the client 802 to service node 806. The client 802 then transmits a request 824 to obtain the content (e.g., a streaming media feed) via an application-specific protocol (e.g., RTSP) that causes node 806 to request the streaming-media channel across the wide-area by sending a channel subscription message 826 to service node 808 using the channel description information in the client request (for example, see No. 60/115454). The result is that content flows from service node 808 to the client as shown by path 828.

Now, it will be assumed that service node 806 fails. The client 802 notices a disruption in service and reacts by re-invoking the stateful anycast procedure described in the previous section: a service request 830 is sent to the anycast address A and received by the ARN 804, which responds with a redirection message 832, directing the client to a new service node 810. The client can now request the new service feed from the service node 810, as shown at 834. The service node 810 sends a subscription message to the node 808 as shown at 836, and the content again flows to the client as shown at 838. Assuming the client utilizes adequate buffering before presenting the streaming-media signal to the user (as is common practice to counteract network delay variations), this entire process can proceed without any disruption in service. When the client attaches, it can send packet retransmission requests to service node 810 to position the stream appropriately and retransmit only those packets that were lost during the session failover process.

It might be possible that the client incorrectly infers the failure of service node 806, because for example, of a momentary network outage. In this case, the client can simply ignore the redirection message 832 and continue to receive service from service node 806.

Wide-area Overflow

One potential problem with the service rendezvous mechanism described above is that a given service node installation may run out of capacity because too many clients are routed to that installation. This may be solved in an embodiment where the redirection system is capable of redirecting client service requests across the wide area in cases of overload. For example, if all of the local service nodes are running at capacity, the redirector can choose a non-local service node and redirect the client accordingly. This redirection decision can in turn be influenced by network and server health measurements. In this approach, the redirector sends period "probe" messages to the candidate servers to measure the network path latency. Since the redirector is typically near the requesting client, these redirector-to-server measurements represent an accurate estimate of the corresponding network path between the client and the candidate server.

In this embodiment, there are three steps to performing wide-area redirection:

ARNs discover candidate service nodes.

ARNs measure network path characteristics between each service node and itself.

ARNs query service nodes for their health.

Given information obtained from the above steps, ARNs can choose the service node that is likely to provide the best quality of service to any requesting client. To do so, each ARN maintains an information database containing load information about some number of eligible service nodes. The ARN consults its information database to determine the most available service node for each client request. To maintain its load information, an ARN can actively probe network paths and service nodes. Alternatively, service nodes can monitor network load and internal load, and report load information to their respective ARNs.

To effect local-area load balancing, each ARN is configured with the IP addresses of some number of nearby service nodes. The ARN maintains load information for these service nodes. However, this local-area approach suffers when load is geographically concentrated, since the ARN may have fully loaded all of its nearby service nodes, and thereby be forced to deny additional service requests from its clients. This can occur even though some number of service nodes just beyond the local area are underutilized.

Wide-area load balancing in accordance with the present invention overcomes the above described problem. In wide-area load balancing, each ARN is configured with the IP addresses of all service nodes in the network and maintains an information database containing load information for all service nodes. Alternatively, the ARNs may exchange load information using a flooding algorithm.

Another embodiment of the present invention employs a scheme called variable-area load balancing. With this scheme, each ARN maintains the information database for some number of eligible service nodes; and the number of eligible service nodes increases with local load. That is, as nearby service nodes approach their capacity, the ARN adds to its information database load information about some number of service nodes just beyond the current scope of the ARN. The following provides two different methods that may be used to discover incrementally distant service nodes.

In a first method, the ARN is provisioned with the IP addresses of some number of adjacent service nodes. To identify incrementally distant service nodes, the ARN simply queries these service nodes for a list of neighboring service nodes since the service nodes are presumed to form a virtual overlay network. This approach may be referred to as "overlay network crawling."

In a second technique, each ARN and each service node is assigned a multi-part name from a hierarchical name space. Given the names of two service nodes, an ARN can determine which is nearest using a longest pattern match. For example, an ARN named:

arn.sanjose.california.pacificcoast.usa.northamerica can determine that it is closer to the service node named;

sn.seattle.washington.pacificcoast.usa.northamerica than it is to the service node named;

sn.orlando.florida.atlanticcoast.usa.northamerica using a right-to-left longest pattern match. Each ARN can retrieve a directory of all service node names and their corresponding IP addresses. The directory may be implemented using DNS or an analogous distributed directory technology. This variable-area load balancing scheme handles geographically concentrated load by redirecting clients to incrementally distant service nodes. The scheme addresses scalability concerns by minimizing the number of ARN-to-service-node relationships. That is, an ARN only monitors the number of service nodes required to serve its near-term client load. Moreover, the rate at which ARNs probe candidate service nodes is adjusted in inverse proportion to the distance, since in general the number of nodes at a distance that is N hops from a given node grows with N.

Figure 7:
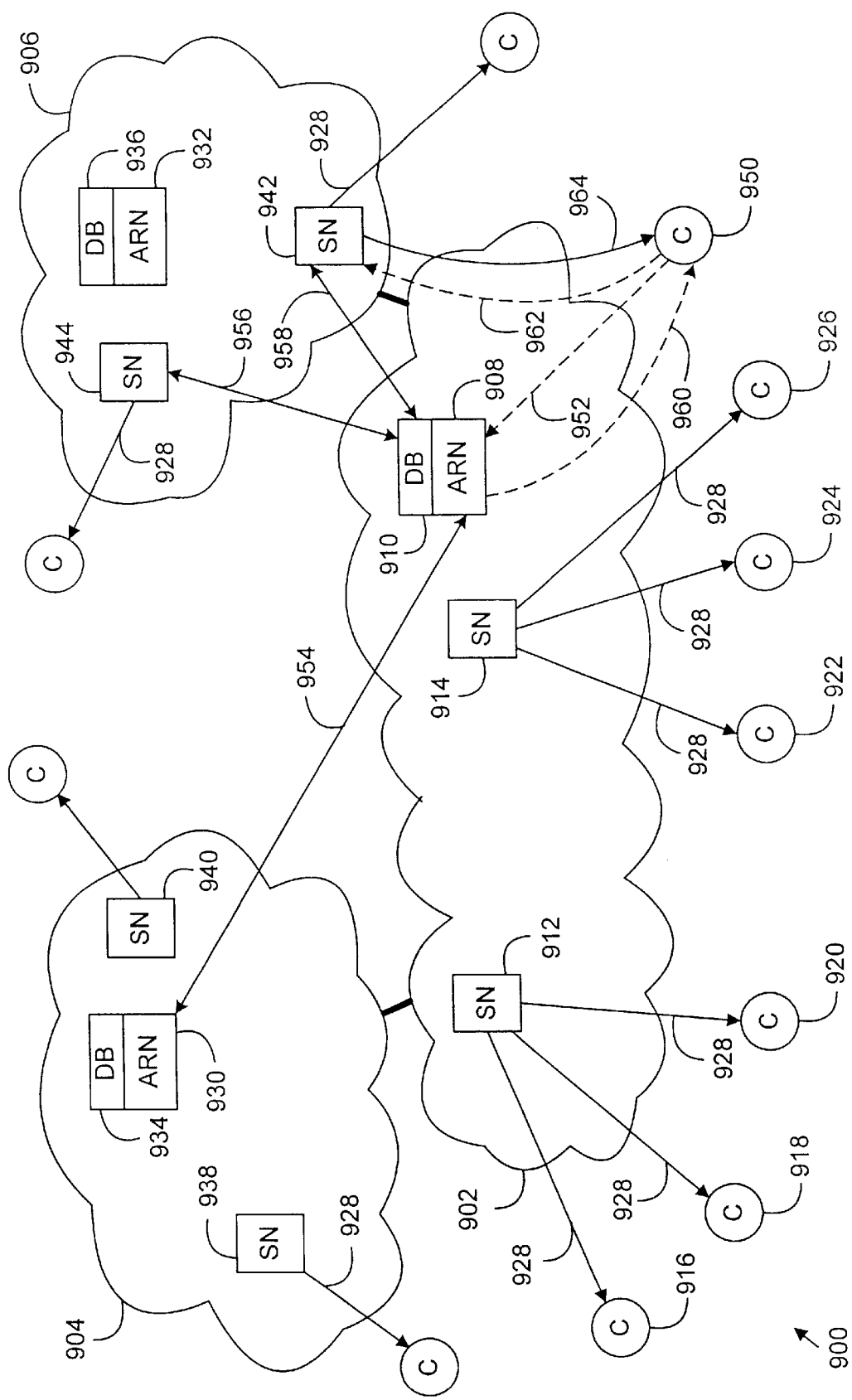
FIG. 7 shows a portion of a data network constructed in accordance with the present invention to implement wide area overflow.

FIG. 7 shows a portion of a data network 900 constructed in accordance with the present invention. The data network 900 includes three connected local networks 902, 904 and 906. As described in one embodiment of the present invention, the network 900 is configured to provide wide area overflow.

The local network 902 includes ARN 908 (redirector) that has an associated information database (DB) 910. Also included in the local network 902 are service nodes 912 and 914. The service nodes are shown providing information content 928 to clients (C) 916, 918, 920, 922, 924, and 926.

The networks 904 and 906 include ARNs 930, 932, information databases 934, 936 and service nodes 938, 940, 942 and 944, respectively. These service nodes are providing the information content 928 to a number of other clients.

The ARN 908 monitors network loading characteristics of its local service nodes 912 and 914. This loading information is stored in the DB 910. The ARN may also monitor loading characteristics of other service nodes. In one embodiment, the ARNs exchange loading information which each other. For example, the loading characteristics of the service nodes 938 and 940 are monitored by ARN 930 and stored in DB 934. The ARN 930 may exchange this loading information with the ARN 908 as shown at 954. In another embodiment, the ARNs may actively probe other service nodes to determine their loading characteristics. These characteristics can then be stored for future use. For example, the ARN 908 probes service node 944 as shown at 956 and also probes service node 942, as shown at 958. Therefore, there are several ways in which the ARN can determine loading characteristics of service nodes located in both the local network and over the wide area.

At some point in time, client 950 attempts to receive the information content 928. The client 950 sends an anycast request 952 into network 902 where the request 952 is received by the ARN 908. The ARN 908 may redirect the client 950 to one of the local service nodes (912, 914), however, the DB 910 associated with ARN 908 shows that the local service nodes may not be able to provide the requested services to client 950. The ARN 908 is able to used the information DB 910 to determine which service node would be most appropriate to handle the request from client 950. The selected service node is not limited to those in the local network with the ARN 908. Any service node over the wide area may be selected.

The ARN 908 determines that service node 942 should service the request from client 950. The ARN 908 sends a redirection message 960 to the client 950, and thereby redirects the client to the service node 942. The client 950 sends the request to the service node 942 using a transport layer protocol like TCP, as shown at 962. The service node 942 responds by providing the client with the requested information content as shown at 964.

Therefore, using the information database and the ability to probe service nodes to obtain loading characteristics, the referral nodes are able to effectuate wide area loading balancing in accordance with the present invention.

Technical Extensions

This section describes additional embodiments to the to the invention that comprise technical extensions to the embodiments described above.

Last-hop Multicast

The use of IP Multicast could be exploited locally as a forwarding optimization in the "last-hop" delivery of broadcast content. Thus, it is possible for a client to issue an anycast request, and as a result, be redirected to join a multicast group.

Figure 8:
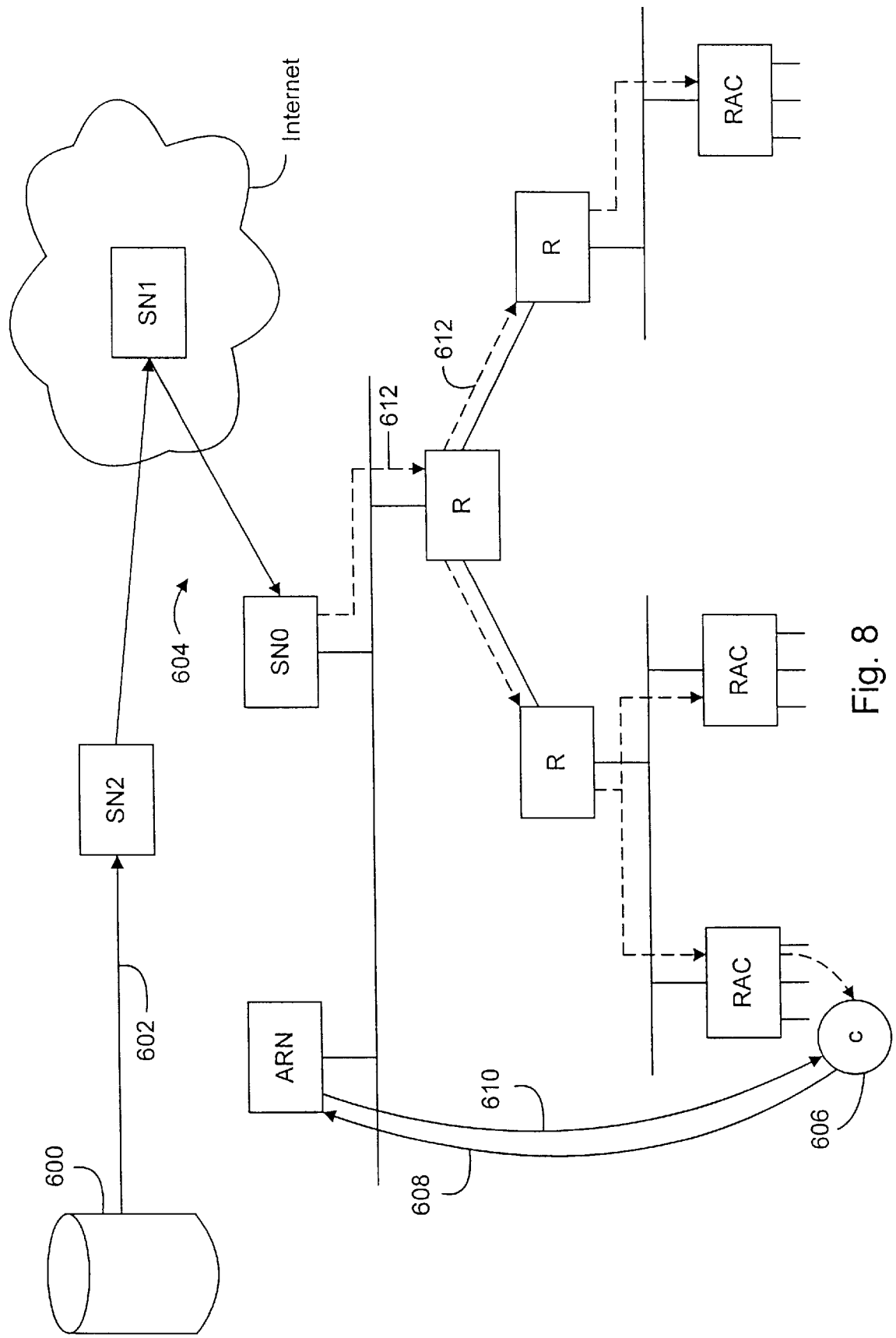
FIG. 8 illustrates the use of IP Multicast in accordance with the present invention.

FIG. 8 illustrates an embodiment of the present invention that uses IP Multicast. A content provider 600 provides three service nodes SN0–SN3 for providing information content 602 via an application level multicast tree 604. A client 606 request a service feed, as described above, that is received by the ARN, as shown at path 608. The ARN redirects the request to the service node SN0 to initiate a data transfer, as shown at path 610. Rather than initiate a separate data channel for each client, however, the service node instructs the client (via the control connection) to subscribe to a particular multicast group 612 (say group G) to receive the information content. The client then joins the multicast group and the service node SN0 transmits the information content to the group in the local environment.

As shown, the multicast traffic is replicated only at fan out points in the distribution path from the service node SN0 to all clients receiving the flow. Simultaneously, the service node SN0 would contact an upstream service node SN1 to receive the information content over a unicast connection. In this fashion, content is broadcast to all interested receivers without having to enable multicast throughout the entire network infrastructure.

Sender Attachment

The system described thus far has relied on anycast routing to route client requests to the nearest service nodes. Similarly, anycast could be used to bridge the server at the originating site of the content to.the closest service entry point. If content servers are explicitly configured into a broadcasting infrastructure, the system described herein could be adapted for registering and connecting service installations to the broadcasting infrastructure.

Figure 9:
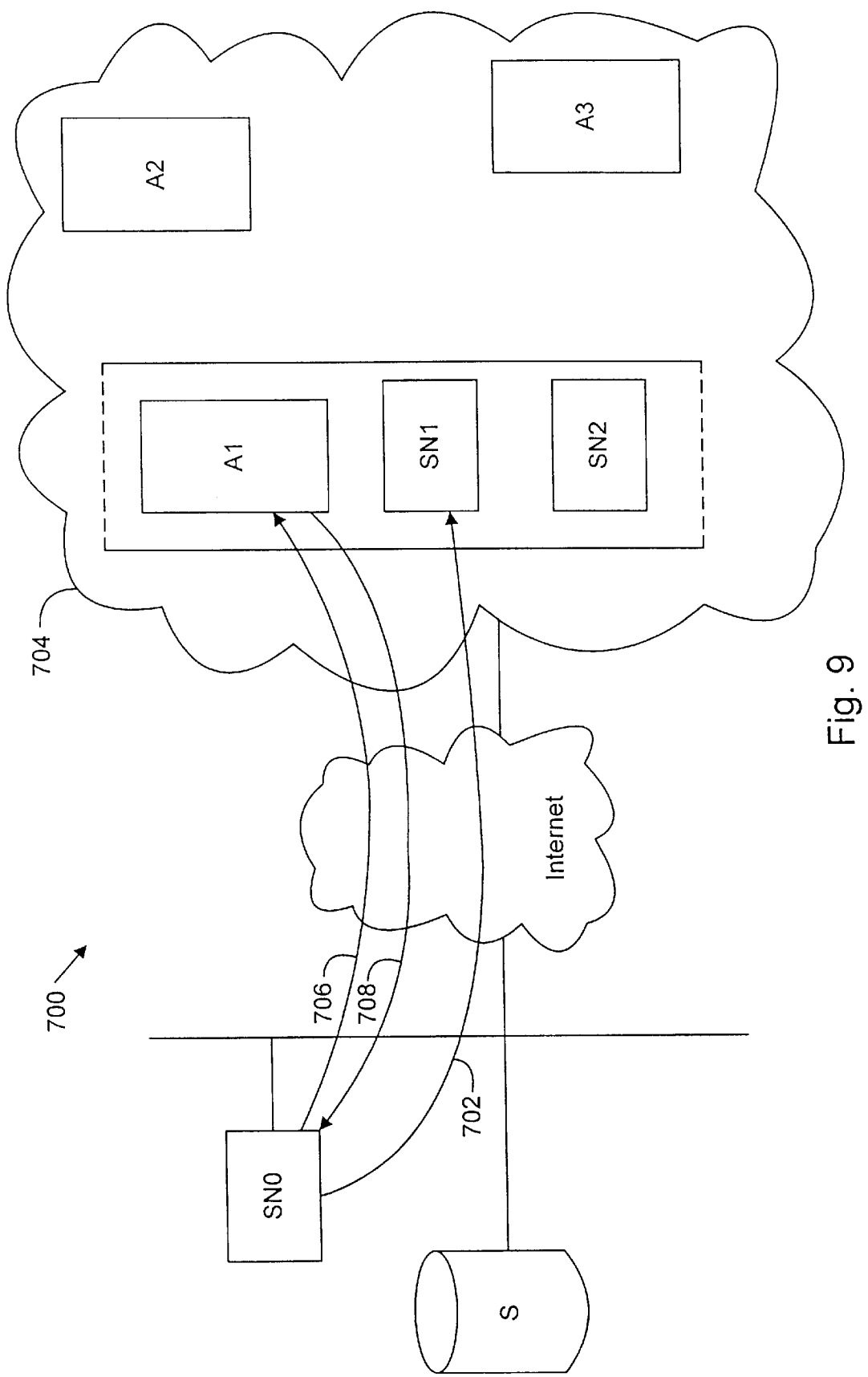
FIG. 9 shows an embodiment of the present invention adapted for registering and connecting service installations to the service broadcast network infrastructure.

FIG. 9 shows an embodiment 700 of the present invention adapted for registering and connecting service installations to the broadcasting infrastructure. A service node SN0 wishes to inject a new broadcast channel from a nearby server S into a content broadcast network 704. The service node SN0 sends a service query 706 using an anycast address. The service query requests the identity of a service node within the broadcast network 704 most available to serve as the endpoint for a new IP tunnel from SN0. The service query carries an anycast address, and is routed to the nearest ARN, in this case, A1. A1 selects the most available service node, and may also update a channel database within broadcast network 704 indicating that the new channel is available through SN0. In this case, A1 selects SNI and sends a response 708 to SN0. The response instructs SN0 to establish a new IP tunneling circuit 702 to service node SNI.

This sender attachment system allows an overlay broadcast network to be dynamically extended to reach additional servers. This sender attachment system, when used with the client-attachment systems described previously, provides a comprehensive architecture for dynamically mapping client-server traffic onto a series of one or more tunneling circuits, with one tunneling endpoint nearest the client, and one tunneling endpoint nearest the server. The mapping is performed in a way that is transparent to the client and server applications, and is transparent to their respective access routers.

Multiple Masters

In various embodiments described herein, only the master AS advertises the anycast address block via the interdomain routing protocol. There are two extensions to this scheme. First, the system can be extended to allow multiple master AS's to coexist by partitioning the anycast address space among them. That is, multiple instances of the system described herein would be fully functional and non-interfering as long as they use distinct address spaces for their anycast blocks. Second, the system can be extended to allow multiple master AS's to advertise the same or overlapping address blocks. In this case, the minimum-distance anycast routing would operate at both the intradomain and interdomain routing levels. For example, there could be a master AS in the North America and a master AS in Europe advertising the same anycast block externally, e.g. via BGP. Then, a packet sent from an arbitrary client would be sent to whichever master AS is closest, and once inside that AS, the packet is routed to the nearest service node therein or redirected across the wide-area if necessary.

The present invention provides a comprehensive redirection system for content distribution based on a virtual overlay broadcast network. It will be apparent to those with skill in the art that the above methods and embodiments can be modified or combined without deviating from the scope of the present invention. Accordingly, the disclosures and descriptions herein are intended to be illustrative, but not limiting, of the scope of the invention which is set forth in the following claims.

What is claimed is:

1. A packet-switched network including addressable routers for routing packet traffic, wherein a packet of data is routed from a source node to a destination node based on address fields of the packet, the packet-switched network comprising:

at least one service node coupled to at least first one of the addressable routers and having logic to propagate data packets between a client and a plurality of nodes in an anycast group; and at least one redirector coupled to at least a second one of the addressable routers, the at least one redirector comprising:

A) logic for advertising, to the at least a second one of the addressable routers, reachability to an anycast destination address associated with the plurality of nodes in the anycast group, wherein a packet sent to the anycast destination address can be routed to a plurality of destination nodes;

B) logic for accepting a service request from the client, wherein the service request is an anycast message to the anycast destination address; and C) logic for generating a redirection message directed to the client for redirecting the service request to the at least one service node.

2. The packet-switched network of claim 1 wherein the at least one service node comprises a plurality of service nodes and the at least one redirector comprises:

logic to determine a selected service node from the plurality of service nodes for handling the service request; and logic for generating a redirection message directed to the client for redirecting the service request to the selected service node.

3. The packet-switched network of claim 2 wherein the logic to determine the selected service node from the plurality of service nodes comprises:

logic to monitor a network traffic condition at the plurality of service nodes; and logic to select the selected service node from the plurality of service nodes based on the network traffic condition.

4. The packet-switched network of claim 2 wherein the logic to determine the selected service node from the plurality of service nodes comprises:

logic to monitor a server condition at the plurality of service nodes; and logic to select the selected service node from the plurality of service nodes based on the server condition.

5. The packet-switched network of claim 1, wherein a first portion of the plurality of nodes in the anycast group are located at a first geographic location, and wherein a second portion of the plurality of nodes in the anycast group are located at a second geographic location, the redirector further comprising:

logic for determining whether the client sending the anycast service request is closer to the first portion of nodes in the anycast group or the second portion of nodes in the anycast group; and logic for generating the redirection message directed to the client for redirecting the service request to a first service node if the client is closer to the first portion of nodes in the anycast group and for redirecting the service request to a second service node if the client is closer to the second portion of nodes in the anycast group.

6. A method of operating a packet-switched network including addressable routers for routing packet traffic, wherein a packet of data is routed from a source node to a destination node based on address fields of the packet, and wherein the packet-switched network includes a redirector coupled to at least one of the addressable routers and at least one service node, the method comprising:

advertising, to an addressable router coupled to the redirector, reachability to an anycast destination address from the redirector, wherein a packet sent to the anycast destination address can be routed to a plurality of destination nodes;

accepting a service request from a client at the redirector, wherein the service request is an anycast message to the anycast destination address; and generating a redirection message directed to the client for redirecting the service request to the at least one service node.

7. The method of claim 6 wherein the at least one service node comprises a plurality of service nodes, and the step of generating comprises steps of:

determining a selected service node from the plurality of service nodes for handling the service request; and generating a redirection message directed to the client for redirecting the service request to the selected service node.

8. The method of claim 7 wherein the step of determining comprises steps of:

monitoring a network traffic condition at the plurality of service nodes; and selecting the selected service node from the plurality of service nodes based on the network traffic condition.

9. The method of claim 7 wherein the step of determining comprises steps of:

monitoring a server condition at the plurality of service nodes; and selecting the selected service node from the plurality of service nodes based on the server condition.

10. The method of claim 6, wherein a first portion of the plurality of nodes in the anycast group are located at a first geographic location, and wherein a second portion of the plurality of nodes in the anycast group are located at a second geographic location, and the step of generating comprising steps of:

determining whether the client sending the anycast service request is closer to the first portion of nodes in the anycast group or the second portion of nodes in the anycast group; and generating the redirection message directed to the client for redirecting the service request to a first service node if the client is closer to the first portion of nodes in the anycast group and for redirecting the service request to a second service node if the client is closer to the second portion of nodes in the anycast group.

11. A method of operating a redirector in a packet-switched network including addressable routers for routing packet traffic, wherein a packet of data is routed from a source node to a destination node based on address fields of the packet, the method comprising:

advertising, to an addressable router coupled to the redirector, reachability to an anycast destination address from the redirector, wherein a packet sent to the anycast destination address can be routed to a plurality of destination nodes;

accepting a service request from a client, wherein the service request is an anycast message to the anycast destination address;

determining a selected server for handling the service request, the selected server being one of a plurality of servers that can handle the service request; and generating a redirection message directed to the client for redirecting the service request to the selected server.

12. The method of claim 11 further comprising a step of monitoring a traffic condition of the plurality of servers.

13. The method of claim 12 wherein the step of determining comprises a step of determining the selected server from the plurality of servers based on the traffic condition.

14. The method of claim 11 further comprising a step of monitoring a server condition of the plurality of servers.

15. The method of claim 14 wherein the step of determining comprises a step of determining the selected server from the plurality of servers based on the server condition.

16. The method of claim 11 further comprising a step of handling the service request at the redirector.

17. The method of claim 11 wherein the step of generating comprises a step of generating a redirection message directed to the client for redirecting the client to subscribe to a multicast group at the selected server.

18. In a packet-switched network including addressable routers for routing packet traffic, wherein a packet of data is routed from a source node to a destination node based on address fields of the packet, an improvement comprising:

a redirector coupled to at least one of the addressable routers, the redirector including:

logic for advertising, to the at least one of the addressable routers, reachability for an anycast destination address, wherein a packet sent to the anycast destination address can be routed to a plurality of destination nodes;

logic for accepting a service request from a client, wherein the service request is an anycast message to the anycast destination address;

logic for determining a selected server for handling the service request, the selected server being one of a plurality of servers that can handle the service request; and logic for generating a redirection message directed to the client for redirecting the service request to the selected server.

19. The redirector of claim 18 wherein the logic for determining comprises:

logic for monitoring a network traffic condition of the plurality of servers; and logic for selecting the selected server from the plurality of servers based on the network traffic condition.

20. The redirector of claim 18 wherein the logic for determining comprises:

logic for monitoring a server condition of the plurality of servers; and logic for selecting the selected server from the plurality of servers based on the server condition.

21. The packet-switched network of claim 18, wherein the selected server is a multicasting server.

22. The packet-switched network of claim 18, wherein the redirector is the selected server.

* * * * *